Patented Feb. 3, 1931

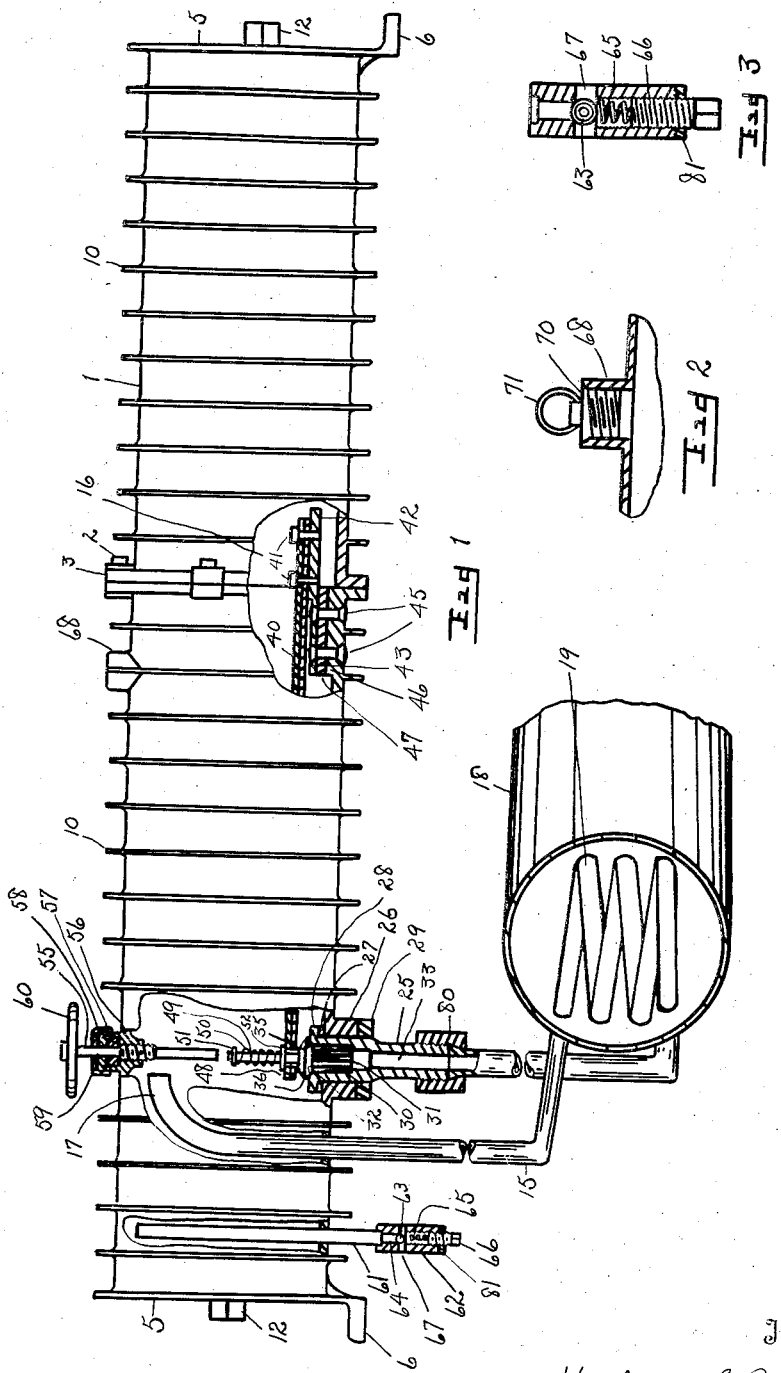

1,790,720

UNITED STATES PATENT OFFICE

HERBERT S. POWELL, OF UTICA, NEW YORK

HEATER FOR AUTOMOBILES

Application filed May 18, 1928. Serial No. 278,888.

My invention relates to a heater for automobiles, and I declare the following to be a full, clear, concise and exact description thereof sufficient to enable any one skilled in the art to which it appertains to make and use the same, reference being had to the accompanying drawings in which like reference characters refer to like parts throughout the specification.

The object of the invention is to provide a heater that can be placed in an automobile, preferably on the floor, just behind the front seat or one of the front seats.

It will be filled with a non-freezing fluid which will be passed through a coil in the exhaust pipe to be heated. The coil in turn is heated by the exhaust gases from the internal combustion engine as said gases pass out of the exhaust pipe in which the coil is disposed.

In order to provide against overheating of the fluid in the heater, the circulation thereof is arrested automatically by means of a valve operated by a thermostat. These and other objects will be apparent from an examination of the drawings, in which:

Fig. 1 is an elevational view of the heater showing parts broken away.

Fig. 2 is a detail view showing a section of the inlet port, somewhat enlarged.

Fig. 3 is a detail enlarged view of a valve casing and immediate parts employed.

Referring more particularly to the drawings, the invention embodies a cylindrical casing 1 which may be made in sections and bolted together as by bolts 2 passing through raised portions or annular flanges 3 of said casing 1. Casing 1 is equipped with end portions 5, 5 that are made integral with said casing 1 and provided with standards 6, 6 adapted to support the heater upon the floor of the automobile. Annular fins 10 are formed integral with the extension surface of casing 1, whereby to aid in disseminating or radiating the heat. Members 12, 12 are plugs screw mounted into the ends of casing 1.

A tube 15 projects into the interior chamber 16 formed by casing 1. Its upper end 17 is bent at an angle whereby to direct the liquid lengthwise of chamber 16. Tube 15 has an air tight fit with casing 1 whereby there is no leakage at that location. A portion of tube 15 extends to a position within pipe 18 through which the exhaust gases of the engine pass to the atmosphere. The part of tube 15 within exhaust pipe 18 is formed into a coil 19, whereby to increase the surface exposed to the influence of the heated exhaust gases. The opposite end of tube 15 is held to member 25 by a nut 80 screw mounted to the outer end of gland member 25. Member 25 is projected through casing 1 and held in an air tight position thereto. To this end it has a close fit with the enlarged part 26 of casing 1. Furthermore, a rubber gasket 27 is disposed between the head 28 and the inner surface of casing 1. Nut 29 is screw mounted to a threaded portion of gland member 25, whereby to hold the parts in air tight relation to each other. Valve seat 32 is made on the inner end of member 25 by countersinking the head 28 on a bevel as at 35. Valve 36 is adapted to be seated thereon for the purpose of closing passageway 31 through member 25 when the liquid has reached a certain temperature. The depending part 30 of valve 36 is fitted within passageway 33 of member 25 and is fluted on its lateral surface as at 31 for the escape of the liquid therepast when valve 36 is opened.

The means for automatically closing valve 36 embodies a thermostat 40, which is attached by screw bolts 41, 41 to plate 42 having a reduced portion at 43 mounted by rivets 45, 45 to an enlarged part 46 of casing 1. A block 47 is disposed therebetween. The free end 48 of thermostat 40 has an aperture for the free sliding movement of valve stem 49 which projects upward therethrough. Valve stem 49 is made integral with valve 36 and is held offseated by a coiled spring 50 surrounding stem 49 and pressing upward against collar 51 formed integral with valve stem 49 and collar 52 disposed on the upper surface of thermostat 40. Valve 36 will be automatically forced downward upon its seat 32 when the temperature of the non-freezing liquid reaches a predetermined degree by the expansion of the metals of said thermostat, whereby to close said valve and stop the further circulation of the liquid through coil 19.

Valve 36 may be closed permanently by shaft 55 screw threaded to an enlarged part 56 of casing 1.

Part 56 forms a gland and to this end has a chamber for the disposition of packing 57 held in place by head member 58 and cap 59 which is screw mounted to the external threads of part 56. A hand wheel 60 is fixed to the outer end of shaft 55 so as to turn said shaft 55 to project it against the upper end of valve stem 49 whereby to close valve 36 or to be turned in opposite direction to open valve 36.

An overflow pipe 61 is projected up into casing 1. Its upper end is adjacent the inner surface of casing 1. A valve casing 62 is mounted to the lower end of pipe 61. Ball valve 63 is held against the lower end of conduit 64 by a spring 65 which in turn rests against adjustable screw plug 66. The overflow steam or vapor will press against ball valve 63 until it overcomes the tension of spring 65 to escape by way of conduit 67. A lock nut 81 is screw mounted to plug 66 to aid in holding it in position.

The liquid is poured into casing 1 by way of port 68 which is covered by a screw threaded plug 70 having a ring 71 to the level of the overflow pipe 61.

In operation, the hot exhaust gases passing through exhaust pipe 18 will heat coil 10 and thereby cause the non-freezing liquid to begin to circulate and to pass through tube 15 into casing 1 by way of end 17 of tube 15 and throughout casing 1 returning by way of passageway 33 to coil 19. Immediately the temperature of the water has reached a certain degree Fahrenheit, thermostat 40 will automatically close valve 36 and stop the circulation and continue closed until the temperature of the liquid has dropped sufficiently to cause thermostat 40 to react and, thereby, permit spring 50 to elevate valve 36 from its closed position. Furthermore, the circulation can be stopped permanently by turning hand wheel 60. The overflow will be accommodated by way of pipe 61.

Having thus described my invention what I claim as new and desire to secure by Letters Patent is as follows:

1. In a heater for automobiles, a container for holding a liquid, an exhaust pipe adapted to permit the passage of the hot exhaust gases from the engine of the automobile, another pipe connected to said container and leading into said exhaust pipe, a coil formed in said last named pipe and disposed within said exhaust pipe, whereby to absorb heat from the exhaust gases to heat said liquid and cause it to circulate through said container whereby said container will radiate heat to the air in the automobile, a valve located in said container for controlling the circulation of said liquid, and a thermostat for controlling the actuation of said valve.

2. In a heater for automobiles, a container for holding a liquid, an exhaust pipe adapted to permit the passage of the hot exhaust gases from the engine of the automobile, another pipe connected to said container and leading into said exhaust pipe, a coil formed in said last named pipe and disposed within said exhaust pipe, to absorb heat from the exhaust gases to heat said liquid and cause it to circulate through said container, whereby said container will radiate heat to the air in the automobile, and a valve located in said container for controlling the circulation of said liquid.

3. In a heater for automobiles, a container for holding a liquid, an exhaust pipe adapted to permit the passage of the hot exhaust gases from the engine of the automobile, another pipe connected to said container and leading into said exhaust pipe, a coil formed in said last named pipe and disposed within said exhaust pipe, to absorb heat from the exhaust gases to heat said liquid and cause it to circulate through said container whereby said container will radiate heat to the air in the automobile, a valve located in said container for controlling the circulation of said liquid, and an overflow pipe connected with said container.

4. In a heater for automobiles, a container for holding a liquid, an exhaust pipe adapted to permit the passage of the hot exhaust gases from the engine of the automobile, another pipe connected to said container and leading into said exhaust pipe, a coil formed in said last named pipe and disposed within said exhaust pipe to absorb heat from the exhaust gases to heat said liquid and cause it to circulate through said container, whereby said container will radiate heat to the air in the automobile, a valve located in said container for controlling the circulation of said liquid, and automatic means for controlling the actuation of said valve.

In testimony whereof I have affixed my signature.

HERBERT S. POWELL.